July 22, 1958     M. A. MÜLLER     2,844,425
PACKING RING
Filed March 19, 1957
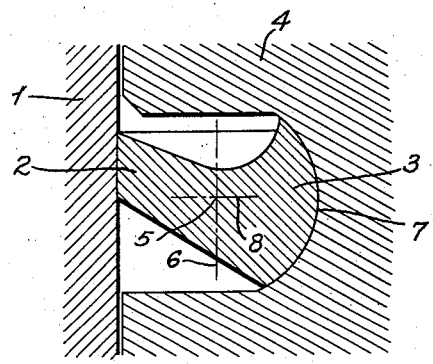
INVENTOR
*Max Adolf Müller*
BY *Thomas, Weisman & Russell*
ATTORNEYS United States Patent Office 2,844,425
Patented July 22, 1958

2,844,425
PACKING RING

Max Adolf Müller, Koln, Germany, assignor, by mesne assignments, to Rand Goetze Corporation, Cleveland, Ohio, a corporation of Ohio Application March 19, 1957, Serial No. 647,141

1 Claim. (Cl. 309—44)

This invention relates to a packing ring made of hard material and intended for equipping pistons, shafts and the like, and has for its principal object a new and improved packing ring of this type that consists of a rounded back portion and a flange portion inclined towards the direction of influx of the gas or fluid and pressed thereby against the surrounding wall of the cylinder or the like, while the rounded back portion is lodged in an equally rounded groove.

It is an object of the invention to provide a packing ring with an inclined flange portion which is not taken off from the cylinder wall when the piston goes down, i. e. in the same direction as the medium to be sealed off.

It is another object of the invention to provide a packing ring with a definite relation between the center of gravity of its section and the center of its back portion circularity or other curvature.

Further objects of the invention not specifically mentioned here will be apparent from the detailed description and claim which follow, reference being had to the accompanying single figure of the drawing in which a preferred embodiment of the invention is shown by way of example.

It is known that piston and packing rings provided with inclined flanges and lodged in equally rounded grooves are turned in the groove by the pressure of the medium to be sealed off on the flange. It is also known that such rings have had an excellent sealing effect. In some cases, however, the flange portion of the ring was taken off the cylinder wall at the down stroke of the piston, owing to inverted torque paralyzing the pressure of the medium to be sealed off.

The present invention is based on the recognition that the center of gravity of the ring section in its relation to the center of the back portion circularity is decisive for overcoming this inconvenience. It is therefore proposed, according to the invention, that the center of gravity of the ring section is situated within the back portion of the ring between its back surface and a plane put parallel to the axis of the piston through the center of the back portion curvature.

In the drawing, a typical piston ring according to the invention is shown to consist, within the cylinder 1, of an inclined flange portion 2 abutting on said cylinder 1, and a rounded back portion 3 lodged in a correspondingly shaped groove of the piston 4. Through the center 5 of the circle of which the outer surface of the ring back portion 3 in the section shown is a part, there is put a plane 6 parallel to the axis of the piston 4. The center 8 of gravity of the ring section is found between the plane 6 and the outer surface 7 of the ring back portion 3.

Having thus complied with the statutes and shown and described a preferred embodiment of my invention, what I consider new and desire to have protected by Letters Patent is pointed out in the appended claim.

What I claim is:

A packing ring made of hard material and intended for sealing pistons, shafts, rods and the like, which consists of a rounded back portion and a flange portion inclined towards the direction of influx of the medium to be sealed off, said flange portion being pressed by said medium against the surrounding wall of the cylinder or the like in which said piston, shaft, rod or the like operates, said rounded back portion being lodged in an equally rounded groove of said piston, shaft, rod or the like, in which the center of gravity of the ring section is situated within said back portion of the ring between its back surface and a plane put parallel to the axis of said piston or the like through the center or focus of the curvature of said back portion.

No references cited.